United States Patent

Keith

(10) Patent No.: US 9,532,434 B2
(45) Date of Patent: Dec. 27, 2016

(54) SYSTEMS AND METHODS OF DETERMINING A TYPE AND FEATURE SET OF A LIGHT SOURCE, AND THE CONTROL THEREOF

(71) Applicant: Google Inc., Mountain View, CA (US)

(72) Inventor: David William Keith, Santa Clara, CA (US)

(73) Assignee: GOOGLE INC., Mountain View, CA (US)

(\*) Notice: Subject to any disclaimer, the term of this patent is extended or adjusted under 35 U.S.C. 154(b) by 0 days.

(21) Appl. No.: 14/585,288

(22) Filed: Dec. 30, 2014

(65) Prior Publication Data

US 2016/0192458 A1    Jun. 30, 2016

(51) Int. Cl.
  *H05B 37/02* (2006.01)
  *H05B 41/39* (2006.01)
  *H05B 33/08* (2006.01)
  *H05B 39/04* (2006.01)

(52) U.S. Cl.
  CPC ...... *H05B 37/0209* (2013.01); *H05B 33/0848* (2013.01); *H05B 39/041* (2013.01); *H05B 41/39* (2013.01)

(58) Field of Classification Search
  CPC ............. H05B 37/0272; H05B 37/0218; F21V 23/0435; G01J 1/4204
  USPC .......................................... 316/291; 315/291
  See application file for complete search history.

(56) References Cited

U.S. PATENT DOCUMENTS

| | | | | |
|---|---|---|---|---|
| 2011/0101871 | A1* | 5/2011 | Schenk | H05B 37/0272 315/149 |
| 2012/0001841 | A1* | 1/2012 | Gokingco | G01J 1/32 345/102 |
| 2012/0280633 | A1 | 11/2012 | Weightman et al. | |
| 2012/0299509 | A1* | 11/2012 | Lee | H04L 41/0806 315/291 |
| 2013/0342131 | A1* | 12/2013 | Recker | H05B 33/0842 315/292 |
| 2015/0077021 | A1* | 3/2015 | Smith | F21V 23/0435 315/362 |
| 2015/0137699 | A1* | 5/2015 | Killo | H05B 37/0272 315/291 |
| 2015/0280440 | A1* | 10/2015 | Wootton | H02J 4/00 307/115 |
| 2015/0296599 | A1* | 10/2015 | Recker | H05B 37/0272 315/153 |
| 2016/0073474 | A1* | 3/2016 | Van De Sluis | H05B 37/0272 315/312 |

OTHER PUBLICATIONS

Dimmable CFL & LED bulbs. Lutron. Sep. 4, 2014.

\* cited by examiner

*Primary Examiner* — Don Le
(74) *Attorney, Agent, or Firm* — Morris & Kamlay LLP

(57) ABSTRACT

Systems and methods of the disclosed subject matter provide to detect the signature of a light source through either electrical signature on a circuit or external light signatures output by the light source, and a switch can change modes and features to match the capabilities of the connected light source. Embodiments of the disclosed subject matter provide a light source, a sensor to determine a type of the light source, and a switch, including a processor, to determine a set of operations according to the determined type of light source, and to control the light source to perform a selected operation from the determined set of operations.

26 Claims, 5 Drawing Sheets

FIG. 5
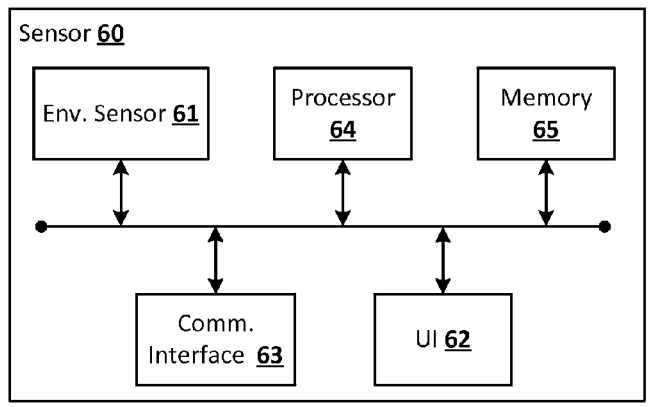
FIG. 6
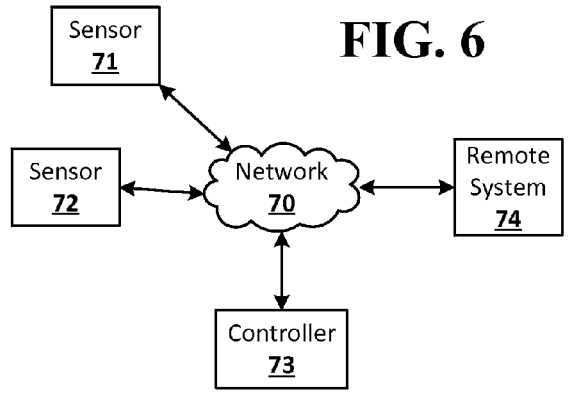
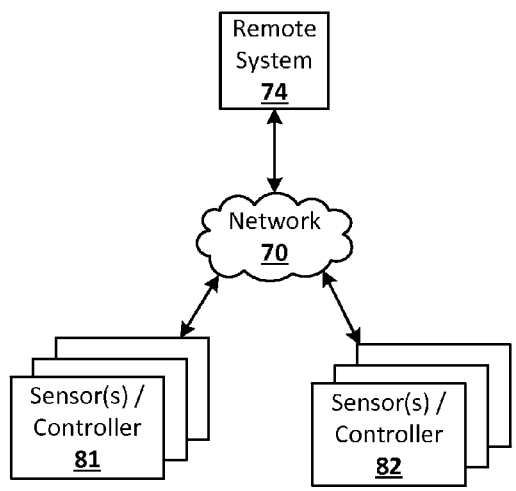
FIG. 7

SYSTEMS AND METHODS OF DETERMINING A TYPE AND FEATURE SET OF A LIGHT SOURCE, AND THE CONTROL THEREOF

BACKGROUND

Currently-available "smart switches" to control lighting fall into several categories. The first category of currently-available switches provide remote electrical switching capabilities, but do not provide dimming or smart light source control. A second category of currently-available switches provides remote electrical switching capabilities with dimming, but does not provide smart light source control. A third category of currently-available switches provides smart light source control, but does not provide control of traditional light sources.

Although traditional dimmer switches can used with compact fluorescent lights (CFLs), they can cause flickering and shortened lifespan due to multiple re-strikes. Dimmer switches that are compatible with CLFs and LED (light emitting diode) light sources typically have dimmers with complex matrixes that govern which light sources (i.e., bulbs) can be used.

In present lighting systems, smart light sources can be made inaccessible by a remote control source when power is switched off at a switch, rather than using software controls. Moreover, current smart light sources can only be controlled via software controls. That is, if a user attempts to control a smart light source with a traditional dimmer switch, the dimmer switch will not be able to control a dimming operation or any other operation of the smart light source.

BRIEF SUMMARY

Embodiments of the disclosed subject matter provide a smart light switch, which includes light source type sensing. For example, the switch can determine whether the light source connected to the smart switch is a smart LED, LED, CFL, incandescent, or the like. The features provided by the smart switch may be according to the determined type of light source.

According to an embodiment of the disclosed subject matter, a system is provided having a light source, a sensor to determine a type of the light source, and a switch, including a processor, to determine a set of operations according to the determined type of light source, and to control the light source to perform a selected operation from the determined set of operations.

According to an embodiment of the disclosed subject matter, a method is provided including determining, by a sensor, a type of light source, determining, by a processor of a switch, a set of operations according to the determined type of light source, and controlling, by the processor associated with the switch, the determined type of light source to perform a selected operation from the determined set of operations.

According to an embodiment of the disclosed subject matter, means for determining a feature set of a light source are provided including determining, by a sensor, a type of light source, determining, by a processor of a switch, a set of operations according to the determined type of light source, and controlling, by the processor of the switch, the determined type of light source to perform a selected operation from the determined set of operations.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 5 shows a sensor according to an embodiment of the disclosed subject matter.

FIG. 6 shows a system according to an embodiment of the disclosed subject matter.

FIG. 7 shows a system according to an embodiment of the disclosed subject matter.

DETAILED DESCRIPTION

Embodiments of the disclosed subject matter provide systems and methods to determine a type of a light source coupled to a smart light switch, where the smart light switch can change modes and features to match the capabilities of the determined type of light source. The embodiments of the disclosed subject matter provide a smart light switch to work with a wide variety of light sources, thus minimizing the difficulty of a user to properly select a light source that is compatible with a switch, and maximizing the features accessible by the user for switch and light source combinations. The embodiments of the disclosed subject matter provide increased ease of use of the remote control of light sources.

Figure 1:
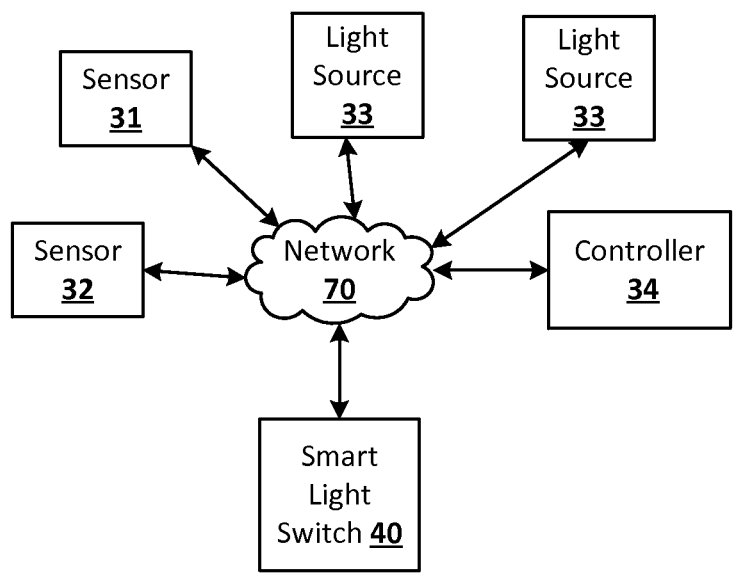
FIG. 1 shows a system according to an embodiment of the disclosed subject matter.

FIG. 1 shows an example of a light switch (e.g., a smart light switch 40) and light source network as disclosed herein, which may be implemented over any suitable wired and/or wireless communication networks 70, and/or electrical power networks.

One or more sensors 31, 32 may communicate via a local network 70, such as a Wi-Fi or other suitable network, with each other and/or with a smart light switch 40 and/or a controller 34. The light switch and light source system of a smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as lighting, appliances, access control, climate control, energy management, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the light switch and light source system of the smart-home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

A sensor 31, 32 coupled to the network 70 may be a light sensor, optical power, and/or wavelength sensor to determine the output of a light source, including the amount of illumination, optical power, and/or spectral distribution of the output of the light source 33. The sensor 31, 32 may detect the radio frequency spectrum of a circuit and/or transformer that controls and/or provides power to the light source, the total harmonic distortion (THD) of power usage of the light source, the temperature coefficient of resistance of a light source, and/or the electrical usage of the light source.

Light source 33 may be an incandescent light source, a compact fluorescent light (CFL) source, fluorescent light source, light emitting diode (LED) light source, halogen light source, a sodium vapor light source, or the like. The light source 33 may be any suitable light source to illuminate an area (e.g., a portion of a room in a home or building, or an outdoor setting, or the like) with light.

The controller 34 may be a general- or special-purpose computer. The controller may, for example, receive, aggregate, and/or analyze environmental information received from the sensors 31, 32. The controller 34 may control the light sources 33 and/or the smart light switch 40. For example, the controller 34 may control the light sources 33 and/or the smart light switch 40 to turn a light source 33 on or off, dim or increase brightness of light source 33, and the like.

The sensors 31, 32 and the controller 34 may be located locally to one another, such as within a single dwelling, office space, building, room, or the like, or they may be remote from each other, such as where the controller 34 as a cloud-based system and/or a user device, such as a personal computer, laptop, tablet computer, smart watch, wearable computing device, and the like. Alternatively or in addition, sensors 32, 32 may communicate directly with the controller 34 situated remotely in a cloud-based system. The controller 34 may, for example, aggregate data from multiple locations, provide instruction, software updates, and/or aggregated data to a controller 34 and/or the smart light switch 40.

Figure 2:
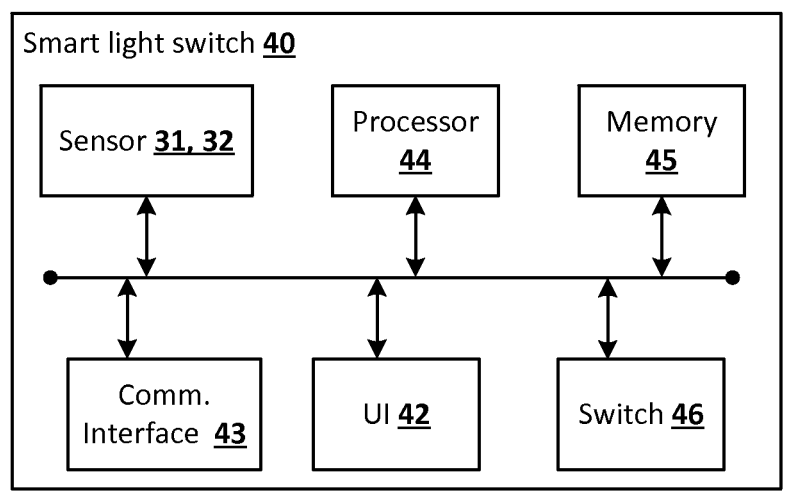
FIG. 2 shows a light switch according to an embodiment of the disclosed subject matter.

An example smart light switch 40 may be communicatively coupled to the network 70, and may control the light source 33, and may receive data and/or information from sensors 31, 32, and may be controlled by controller 34. FIG. 2 shows a smart light switch 40 according to an embodiment of the disclosed subject matter. Although FIG. 1 shows the sensors 31, 32 separate from smart light switch 40, embodiments of the disclosed subject matter may integrate one or more of the sensors 31, 32 with the smart light switch 40. Alternatively, or in addition, one or more of the sensors 31, 32 may be separate from the smart light switch 40, and one or more of the sensors 31, 32 may be integrated with the smart light switch 40. The sensors 31, 32 that are integrated with the controller may have the same features as described above.

The smart light switch 40 may include a user interface (UI) 42, a communication interface 43, a processor 44, a memory 45, and a switch 46. The smart light switch 40 may be coupled to one or more light sources (e.g., light sources 33, and shown in FIG. 1 and discussed below, and/or smart light source 50 shown in FIG. 3).

A processor 44 may receive and/or analyze data obtained by the sensors 31, 32, control operation of other components of the smart light switch 40, and/or process communication between the sensors 31, 32, and other devices via the communications interface 43. The processor 64 may execute instructions stored on a computer-readable memory 45. The memory 45 or another memory in the smart light switch 40 may also store data obtained by the sensor 61. For example, the memory 45 may store optical power data, wavelength and/or spectral distribution data, illumination data, radio frequency spectrum data of a circuit and/or transformer that control and/or power the light source 33, total harmonic distortion (THD) of power usage of the light source 33, temperature coefficient data of resistance of the light source 33, and/or the electrical usage data of the light source 33.

A communication interface 43, such as a Wi-Fi or other wireless interface, Ethernet or other local network interface, a Bluetooth or Bluetooth Low Energy (BTLE) interface, a near field communication (NFC) interface, a radio frequency (RF) interface, or the like may allow for communication by the smart light switch 40 with other devices coupled to the network 70. The UI 42 may be a switch, knob, dial, slider, button, or the like to control a light source 33. The UI 42 may provide information and/or receive input from a user of the smart light switch 40. The UI 42 may include a display to provide selectable options to control the light source 33. For example, the UI 42 may selectively control, according to user input, on and off operations of the light source 33, the dimming and/or brightness control of the light source 33, and the like.

When the smart light switch 40 determines the type of the light source 33, the UI 42 may provide the selectable options to control the identified light source 33. For example, when the smart light switch 40 determines that the light source 33 is a LED light source, the smart light switch 40 may provide options, via the UI 42, for the user to select one or more color temperature options for the output spectrum of the LEDs of light source 33. That is, the smart light switch may adjust the color temperature of the light output by the light source 33 to be warmer (i.e., have more red light content) or cooler (i.e., have more blue light content). The UI 42 may provide options to the user to select a color temperature, or may automatically adjust the output spectrum of the LEDs of the light source 33 by sensing (e.g., with sensors 31, 32) the output spectrum of other lights sources in a predetermined area (e.g., the same room), and adjust the output spectrum of the LEDs to be similar to that of the other light sources. This may be determined by comparing the sensed output spectrums of other lights with the adjusted output spectrum of the LED light source using the sensors 31, 32. The UI would generally not show the option to adjust color temperature when the smart light switch 40 determines that the light source 33 is, for example, a fluorescent light source because such light sources can only emit light of a fixed color.

When the smart light switch 40 determines that the type of the light source 33 is a fluorescent source, such as a CFL, the UI 42 may also refrain from providing an option for the user to select a dimming and/or brightness control operation, as the attributes of the CFL may not be able to respond to commands, signals, and/or electrical input from the smart light switch 40 to control a dimming and/or brightness operation. However, if the light source 33 is determined to be, for example, an incandescent light, the UI 42 may provide options for the user to select a dimming and/or brightness operation, as the smart light switch may be able to provide an electrical output to control such an operation. That is, unlike the CFL, the filament of the incandescent source may respond to different input voltage and/or current levels, and correspondingly provide different optical power output.

When the smart light switch 40 determines that the type of light source 33 is an incandescent, halogen, and/or arc lamp source which may radiate more heat than fluorescent and/or LED sources, the UI 82 may provide an option to the user to automatically turn off the light source 33 when the temperature of the light source is determined to be above a present and/or adjustable temperature level. One or more of the sensors 31, 32, and/or a sensor that is integrated with the light source 33 may monitor the temperature of the light source 33, and may provide the sensed data to the smart light switch 40 to turn off the light source 33 when the temperature exceeds the preset threshold level.

The UI 42 may be relatively minimal, such as a limited-output display, or it may be a full-featured interface such as a touchscreen. Components within the smart light switch 40 may transmit and receive information to and from one another via an internal bus or other mechanism as will be readily understood by one of skill in the art. One or more components may be implemented in a single physical arrangement, such as where multiple components are implemented on a single integrated circuit. The smart light switch 40 as disclosed herein may include other components, and/or may not include all of the illustrative components shown.

Figure 3:
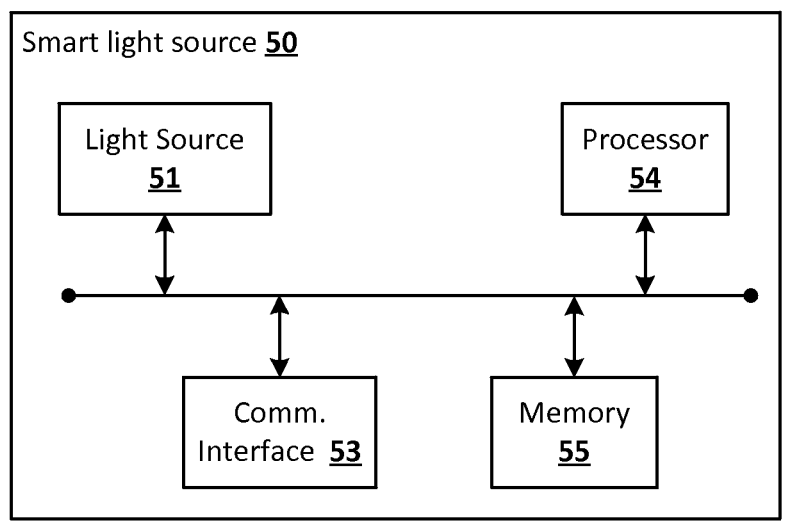
FIG. 3 shows a smart light source according to an embodiment of the disclosed subject matter.

FIG. 3 shows a smart light source 50 according to an embodiment of the disclosed subject matter. The smart light source 50 may be light source 33 shown in FIG. 1. The smart light source 50 may include light source 51, communication interface 53, processor 54, and memory 55.

The light source 51 may be a LED light source or any other suitable light source as described above in connection with light source 33 of FIG. 1. A processor 54 may receive and analyze data obtained by the sensors 31, 32, control operation of other components of the smart light source 50, and process communication between the sensor and other devices via the communications interface 53. The processor 54 may execute instructions stored on a computer-readable memory 55. The memory 55 or another memory in the smart light source 50 may also store data obtained via the sensors 31, 32. For example, the memory may store optical power data, wavelength and/or spectral distribution data, illumination data, radio frequency spectrum data of a circuit and/or transformer to control and/or provide power of the light source 33, total harmonic distortion (THD) of power usage of the light source 33, temperature coefficient data of resistance of a light source 33, and/or the electrical usage data of the light source 33.

Figure 4:
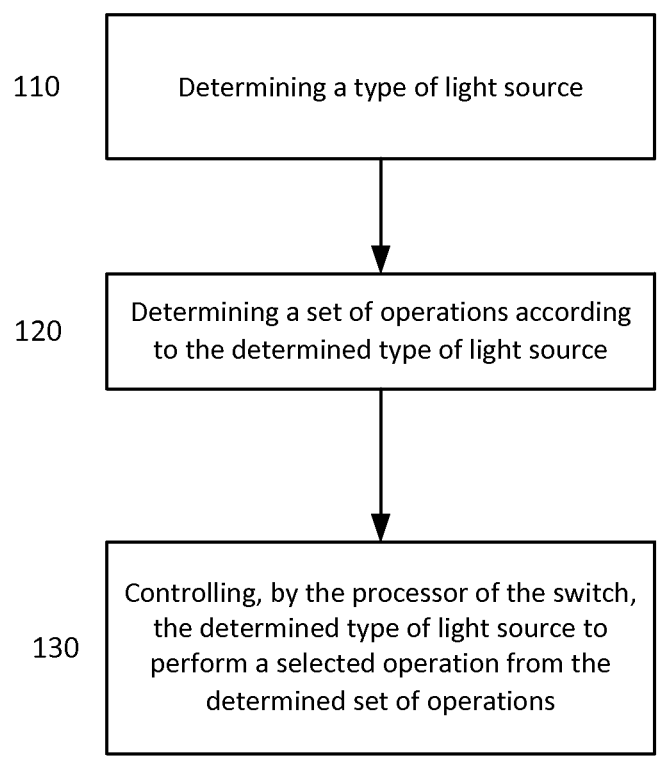
FIG. 4 shows example operations of a method according to an embodiment of the disclosed subject matter.

FIG. 4 shows example operations of a method 100 according to an embodiment of the disclosed subject matter. At operation 110, a sensor, such as sensor 31, 32, may determine a type of light source (e.g., the type of light source 33, which may be an incandescent light source, a compact fluorescent light (CFL) source, fluorescent light source, light emitting diode (LED) light source, halogen light source, and/or a sodium vapor light source). A processor (e.g., processor 44) of the light switch (e.g., smart light switch 40), may determine a set of operations according to the determined type of light source (e.g., light source 33) at operation 120. The processor (e.g., processor 44) of the light switch (e.g., smart light switch 40) may control the determined type of light source (e.g., the type of light source 33, which may be an incandescent light source, a compact fluorescent light (CFL) source, fluorescent light source, light emitting diode (LED) light source, halogen light source, and/or a sodium vapor light source) to perform a selected operation from the determined set of operations at operation 130.

Referring to FIGS. 1-4, the smart light switch 40, using sensors 31, 32, may determine the type of light source 33. Alternatively, or in addition, a controller 73 and/or a remote system 74 discussed below and shown in FIGS. 6-7 may be used in connection with sensors 31, 32, and/or sensors 71, 72 (shown in FIGS. 6-7) to determine the type of light source 33 and/or control its operation.

The smart light switch 40 of the disclosed subject matter may determine, using sensors 31, 32, that the light source 33 is a CFL light source (e.g., at operation 110 shown in FIG. 4). In particular, the smart light switch 40 may detect, using the sensors 31, 32, mercury energy spikes in the output spectrum of the light source 33 to determine that the light source 33 is a CLF light source. That is, the sensors 31, 32, may sense the output spectrum of the light source 33, and may determine that it is a CLF light source according to its spectral output in terms of wavelength. For example, the smart light switch 40 may compare the output spectrum of the light source 33 with pre-stored output spectrums for a set of light sources to determine which pre-stored output spectrum is most similar to the sensed output spectrum from the sensors 31, 32.

In embodiments of the disclosed subject matter, the smart light switch 40 may detect (e.g., using sensors 31, 32) a radio frequency (RF) signature of, for example, an inductor on a circuit (not shown) that controls the operation of and/or power to the light source 33. That is, the smart light switch 40 may detect the total harmonic distortion (THD) signature of power usage on the circuit of the CFL light source. That is, smart light switch 40 may use the sensors 31, 32 to determine the TDH of the power usage by the light source 33 to determine that it is a CFL light source. The smart light switch 40, using the sensors 31, 32, may detect that the light source 33 is a CFL light switch according to an arc strike signature of the light source 33 at startup. That is, the smart light switch 40 may determine that there is a power spike to start the reaction in the light source 33, and thus determine that the light source 33 is a CFL light source. For example, the smart light switch 40 may compare the power usage of the light source 33 when it is turned on with pre-stored usage profiles of different light sources, including a CFL usage profile. That is, the smart light switch 40 may determine that the light source 33 is a CFL light source when the obtained power usage profile upon startup is most similar to a pre-stored CFL usage profile.

The smart switch 40 of the disclosed subject matter may detect whether the light source 33 (e.g., a CFL light source) may be dimmed by reducing voltage, and by using sensors 31, 32 to determine if the light source 33 dims or flashes. That is, sensors 31, 32 may monitor the optical power of the light emitted by the light source 33 to determine if a dimming operation is occurring, and/or may determine if the light source 33 is flashing (e.g., based on the sensed pulsed output of the light source) to determine if the light source 33 is capable of a dimming operation.

The smart light switch 40 of the disclosed subject matter can determine whether the light source 33 is a LED light source. The smart light switch 40 may determine that the light source 33 that is coupled to the smart light switch 40 is an LED light source according to the RF signature of a transformer (e.g., a transformer on a circuit (not shown) that powers and/or controls the light source 33). That is, the smart light switch 40, using the sensors 31, 32 may determine the speed at which the light source 33 begins using electricity. If it is determined that the speed is less than, for example, 500 ms, with a "hard jump" to full power usage which subsequently follows, the smart light switch 40 may determine that the light source 33 is a LED light source. For example, the smart light switch 40 may compare the sensed speed at which the light source 33 begins using electricity with pre-stored profiles for speeds of power usage for a set of light sources, and determine that the light source 33 is a LED light source, as the detected profile of power usage is most similar to the pre-stored power usage of a LED light source.

The smart light switch 40 may detect the dimming capability of the light source 33 by reducing the voltage to the light source 33. Sensors 31, 32 may detect light output by the light source 33 (e.g., the LED light source) to determine if the light source 33 is capable of dimming. That is, by reducing voltage, the light output by the light source 33 may be correspondingly reduced (e.g., less optical power measured by the sensors 31, 32 when the voltage is reduced).

The sensors 31, 32 and the smart light switch 40 of the disclosed subject matter may determine whether a light source 33 is an incandescent light source. The smart light switch 40 may detect a temperature coefficient of resistance as the light source 33 turns on. The smart light switch 40 may compare the coefficient of resistance which may be measured with the sensors 31, 32 with that of a pre-stored curve of electrical usage as the light source 33 increases to full brightness over, for example, the first few hundred milliseconds (e.g., 100 ms, 200 ms, 400 ms, 500 ms, 700 ms, and the like). By this comparison, the smart light switch 40 may determine whether the light source 33 is an incandescent light source.

The sensors 31, 32 and the smart light switch 40 of the disclosed subject matter may determine whether a light source 33 is a smart light source, such as smart LED light source. The characteristics of the light source 33 obtained from the sensors, 31, 32 may be compared with pre-stored profiles. When the characteristics obtained by the sensors 31, 32 are closest to the pre-stored characteristics of a smart LED light source, the light source 33 may be determined to be a smart LED light source. That is, the sensors 31, 32 may be used to determine that the spectral output of the light source 33 is similar to that of a pre-stored profile for a LED light source, as discussed in detail above. The smart light switch 40 may attempt to communicate with the light source 33 via the network 70 to determine that it is a smart light source. Alternatively, or in addition, when the light source 33 is a smart light source and is added to the network 70, the smart light source may identify itself to other devices of the network, including the smart light switch 40. That is, identification information may be transmitted from the light source 33 to other devices of the network 70, including the smart light switch 40. Alternatively, or in addition, the smart light source 40 may periodically broadcast messages to determine if new devices have joined the network 70, and may receive identification information from the light source 33 that it is a smart light source. That is, by using the sensed spectral output and the identification information from the light source 33, the smart light switch 40 may determine that the light source 33 is a smart LED light source.

In an implementation, communications between the smart switch 40 and a smart light source 33 can occur over home power wires. In this way, communications between switch 40 and light source 33 can be maintained even when the network 70 is down (i.e., not operating normally). This is an advantage over certain known systems where such communications are terminated when the network 70 stops functioning between the smart light switch 40 and the light source 33.

When the type of light source 33 is determined by the smart light switch 40 (or controller 34 of FIG. 1, controller 73 of FIG. 6, and/or remote system 74 of FIGS. 6-7) of the disclosed subject matter, one or more features may be varied. For example, the high/low point for dimming may be varied, where a wattage or brightness (e.g., lumens) range may vary according to the type of light source 33. The dimming control provided by the processor 44 of the smart light switch 40 appropriate for a light source 33 may be varied for each type of light source. In some embodiments, the variance could include a no dimming feature for a particular type of detected light source. The smart light switch 40 may determine the way in which the switch controls the light source. For example, a standard incandescent light source may be dimmed by varying the voltage applied to the light, while a LED may be dimmed by applying a series of on-off electrical signals to cause the LED to flash with a given duty cycle.

The embodiments of the disclosed subject matter may enable a single switch (e.g., smart light switch 40) to work with a wide variety of light sources 33 (e.g., an incandescent light source, a CFL light source, a LED light source, a smart light source, etc.). This can overcome the inconvenience for users of present switch systems, where a user must match a selected bulb they wish to use with a particular switch type that accommodates the selected bulb. Moreover, in present systems, if the pairing done improperly, the user may not be able to use all the features of the switch and/or the light source. Embodiments of the disclosed subject matter allow for users to purchase the light source that meets the current needs of the fixture (e.g., in terms of light output, energy usage, light color, and the like) and be assured that it will work. Users can select one type of switch and use it throughout their home or building, making remote control of light sources a much easier, as matching light sources and switches is not needed.

Embodiments of the disclosed subject matter may sense power usage using the sensors 31, 32 and the smart light switch 40 can automatically turn off power to a circuit when the last light source 33 is removed from a fixture (or the light source 33 is damaged) to improve safety. Notification of removal and/or damage may be provided to a user via a message to the user's computing device (e.g., personal computer, smart phone, smart watch, wearable computing device, tablet, or the like). The user's computing device may be the controller 34, the controller 73, and/or remote system 74. For example, such features may be included for security and safety lighting.

The smart light switch of the disclosed subject matter may be communicatively coupled to a smart-home environment, such as the smart-home environment shown in FIG. 6. In the context of the smart-home environment, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like. The smart light switch of the disclosed subject matter may be controlled by the smart-home network to adjust the light sources of the home.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

A sensor of the smart-home environment may include hardware, in addition to the specific physical sensor that obtains information about the environment. FIG. 5 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors of the smart-home environment as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 6 shows an example of a sensor network as disclosed herein, which may be implemented over any suitable wired and/or wireless communication networks. One or more sensors 71, 72 may communicate via a local network 70, such as a Thread network, Wi-Fi, or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The controller 73 and/or remote system 74 may determine a type of light source 33, and/or may control the operation (e.g., turning on, turning off, dimming, increasing brightness, and the like) of the light source 33. Alternatively, or in addition, the controller 73 and/or the remote system 74 may control the operation of smart light switch 40. The controller 73 and/or remote system 74 may be a computer (e.g., a desktop computer, laptop computer, server, tablet, or the like) or other portable electronic device (e.g., a smartphone, smart watch, wearable computing device, fitness band, a tablet, a key FOB, and the like).

The sensor network shown in FIG. 6 may be an example of the smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 6 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 6.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 6, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 6, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 6 may include one or more intelligent, multi-sensing, network-connected wall switches (e.g., "smart wall switches"), such as the smart light switches as those discussed above in connection with FIGS. 1-4. The smart-home environment of the sensor network shown in FIG. 6 may include one or more intelligent, multi-sensing, network-connected wall plug interfaces (e.g., "smart wall plugs"). The smart wall switches and/or smart wall plugs may be or include one or more of the sensors 71, 72 shown in FIG. 6. A smart wall switch and/or smart light switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches and/or smart light switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). Such detectors may be or include one or more of the sensors 71, 72 shown in FIG. 6. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 6 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 6 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their device (e.g., smartphone, smart watch, wearable computing device, fitness band, key FOB, RFID tag, tablet computer, laptop computer, personal computer, or the like) with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control a lighting system (including light sources 33), including an outdoor lighting system, based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In some configurations of the smart-home environment, as shown in FIG. 7, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 6 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 8:
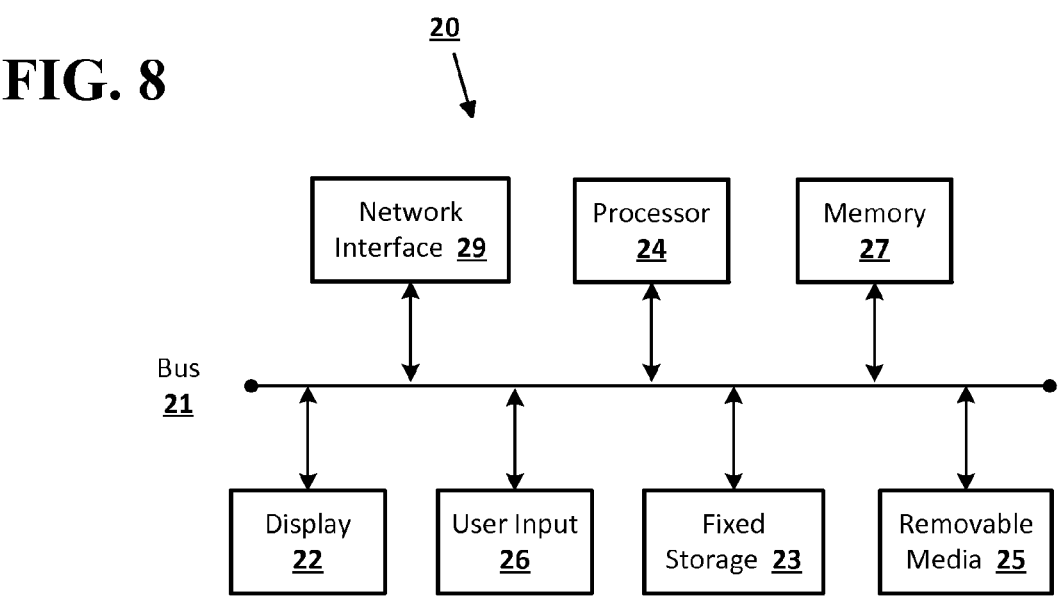
FIG. 8 shows a computing device according to an embodiment of the disclosed subject matter.

Embodiments of the presently disclosed subject matter may be implemented in and used with a variety of computing devices. FIG. 8 is an example computing device 20 suitable for implementing embodiments of the presently disclosed subject matter. For example, the device 20 may be used to implement a controller (e.g., controller 34 discussed above and shown in FIG. 1 and/or controller 73 discussed above and shown in FIG. 6), a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
   a light source;
   a sensor to determine a type of the light source; and
   a switch, including a processor, to determine a set of operations according to the determined type of light source, wherein the determined set of operations includes a dimming operation range, and to control the light source to perform a selected operation from the determined set of operations.

2. The system of claim 1, wherein the sensor determined the type of light source from the group consisting of: a light emitting diode (LED) light source, a smart LED light source, a compact fluorescent light (CFL) source, and an incandescent light source.

3. The system of claim 1, wherein the sensor determines that the type of light source is a CFL light source according to the group consisting of: a mercury energy spike in an output spectrum of the light source, a radio frequency (RF) signature of an inductor of a circuit coupled to the light source, an arc strike at startup of the light source, and a power spike at startup of the light source.

4. The system of claim 3, wherein the processor of the switch determines a dimming operation of the CFL light source by reducing a voltage to the CFL light source, and the sensor determines if the CFL light source dims or flashes according to the reduced voltage.

5. The system of claim 1, wherein the sensor determines that the type of light source is a LED light source according to the group consisting of: a radio frequency (RF) signature of a transformer of a circuit coupled to the light source and a time period at which the light source begins using electricity from a power source.

6. The system of claim 5, wherein the sensor determines the type of light source to be a LED light source when the time period at which the light source begins using electricity from the power source is less than 500 ms.

7. The system of claim 5, wherein the processor of the switch determines a dimming operation of the LED light source by reducing a voltage to the LED light source, and the sensor determines if the LED light source dims according to the reduced voltage.

8. The system of claim 1, wherein the sensor determines that the type of light source is an incandescent light source according to the group consisting of: a temperature coefficient of resistance as the light source is turned on, and a measured electrical usage as the light source transitions to outputting full brightness over a predetermined time period.

9. The system of claim 8, wherein the predetermined time period is selected from the group consisting of: 100 ms, 200 ms, 400 ms, 500 ms, and 700 ms.

10. The system of claim 1, wherein the processor of the switch determines a wattage range to control the dimming of the light source according to the determined type of the light source.

11. The system of claim 1, wherein the processor controls a selection of a dimmer type controllable by the switch according to the determined type of the light source.

12. The system of claim 1, wherein the processor of the switch controls the light source electronically when the type of light source is determined to be from the group consisting of: a light emitting diode (LED) light source, a compact fluorescent light (CFL) source, and an incandescent light source.

13. The system of claim 1, wherein the processor of the switch controls the light source via software when the light source is determined to be smart light source.

14. A method comprising:
   determining, by a sensor, a type of light source;
   determining, by a processor of a switch, a set of operations according to the determined type of light source, wherein the determined set of operations includes a dimming operation range; and
   controlling, by the processor of the switch, the determined type of light source to perform a selected operation from the determined set of operations.

15. The method of claim 14, wherein the determining the type of light source comprises:
   determining the light source from the group consisting of: a light emitting diode (LED) light source, a smart LED light source, a compact fluorescent light (CFL) source, and an incandescent light source.

16. The method of claim 14, wherein the determining the type of light source comprises:
   determining that the light source is a CFL light source according to the group consisiting of: a mercury energy spike in an output spectrum of the light source, a radio frequency (RF) signature of an inductor of a circuit coupled to the light source, an arc strike at startup of the light source, and a power spike at startup of the light source.

17. The method of claim 16, further comprising:
   determining a dimming operation of the CFL light source by reducing a voltage to the CFL light source and determining if the CFL light source dims or flashes according to the reduced voltage.

18. The method of claim 14, the determining the type of light source comprises:
   determining that the light source is a LED light source according to the group consisting of: a radio frequency (RF) signature of a transformer of a circuit coupled to the light source and a time period at which the light source begins using electricity from a power source.

19. The method of claim 18, wherein the determining that the light source is the LED light source when the time period at which the light source begins using electricity from the power source is less than 500 ms.

20. The method of claim 18, further comprising:
   determining a dimming operation of the LED light source by reducing a voltage to the LED light source and determining if the LED light source dims according to the reduced voltage.

21. The method of claim 14, wherein the determining the type of light source comprises:
   determining that the light source is an incandescent light source according to the group consisting of: a temperature coefficient of resistance as the light source is turned on, and a measured electrical usage as the light source transitions to outputting full brightness over a predetermined time period.

22. The method of claim 21, wherein the predetermined time period is selected from the group consisting of: 100 ms, 200 ms, 400 ms, 500 ms, and 700 ms.

23. The method of claim 14, further comprising:
determining a wattage range to control the dimming of the light source according to the determined type of the light source.

24. The method of claim 14, further comprising:
controlling a selection of a dimmer type that is controllable by the switch according to the determined type of the light source.

25. The method of claim 14, further comprising:
controlling the light source electronically when the light source is determined to be from the group consisting of: a light emitting diode (LED) light source, a compact fluorescent light (CFL) source, and an incandescent light source.

26. The method of claim 14, further comprising:
controlling the light source via software when the light source is determined to be smart light source.

* * * * *